(12) United States Patent
Park et al.

(10) Patent No.: US 12,724,519 B2
(45) Date of Patent: Sep. 1, 2026

(54) TOUCH PANEL HAVING SENSING ELECTRODE WITH IMPROVED VISIBILITY

(71) Applicant: G2TOUCH Co., LTD., Seongnam-si (KR)

(72) Inventors: Joo Bin Park, Seongnam-si (KR); Jae Hwan Park, Seongnam-si (KR); Jie On Seo, Seongnam-si (KR)

(73) Assignee: G2TOUCH Co., LTD., Seongnam-si (KR)

(*) Notice: Subject to any disclaimer, the term of this patent is extended or adjusted under 35 U.S.C. 154(b) by 0 days.

(21) Appl. No.: 19/112,400

(22) PCT Filed: Aug. 25, 2023

(86) PCT No.: PCT/KR2023/012615
§ 371 (c)(1),
(2) Date: Mar. 17, 2025

(87) PCT Pub. No.: WO2024/075980
PCT Pub. Date: Apr. 11, 2024

(65) Prior Publication Data

US 2026/0099232 A1 Apr. 9, 2026

(30) Foreign Application Priority Data

Oct. 7, 2022 (KR) ........................ 10-2022-0128327

(51) Int. Cl.
*G06F 3/044* (2006.01)
*G06F 3/041* (2006.01)

(52) U.S. Cl.
CPC ........ *G06F 3/0448* (2019.05); *G06F 3/04164* (2019.05); *G06F 3/0446* (2019.05)

(58) Field of Classification Search
CPC .. G06F 3/0448; G06F 3/0443; G06F 3/04164; G06F 3/0446; G06F 2203/04112
See application file for complete search history.

(56) References Cited

U.S. PATENT DOCUMENTS

2012/0262414 A1 10/2012 Lai
2015/0206501 A1* 7/2015 Kurasawa ......... G02F 1/133553 345/206
2017/0097700 A1* 4/2017 Kim ...................... G06F 3/0443
(Continued)

FOREIGN PATENT DOCUMENTS

KR 10-2014-0034462 A 3/2014
KR 10-2015-0089719 A 8/2015
(Continued)

*Primary Examiner* — Xuemei Zheng

(57) ABSTRACT

The present invention relates to a touch panel for detecting capacitive touch input from a human finger or a touch input tool having similar conductive characteristics thereto, and more particularly, to a touch panel having a sensing electrode with improved visibility. The touch panel having a sensing electrode with improved visibility includes: a plurality of sensing electrodes formed of a transparent conductive material to generate a touch capacitance (Ct) upon approach or touch by a touch means; and a plurality of sensor signal lines transmitting a touch signal generated by the sensing electrodes to a touch IC, wherein both the sensing electrodes and the sensor signal lines are formed in a repeated zigzag shape.

5 Claims, 4 Drawing Sheets

(56) References Cited

U.S. PATENT DOCUMENTS

| | | | | |
|---|---|---|---|---|
| 2018/0335865 | A1* | 11/2018 | Choi | G06F 3/041 |
| 2020/0310572 | A1* | 10/2020 | Wang | G06F 3/0448 |

FOREIGN PATENT DOCUMENTS

| | | | |
|---|---|---|---|
| KR | 10-2015-0125344 | A | 11/2015 |
| KR | 10-2017-0005569 | A | 1/2017 |
| KR | 10-2018-0127084 | A | 11/2018 |

* cited by examiner

TOUCH PANEL HAVING SENSING ELECTRODE WITH IMPROVED VISIBILITY

CROSS-REFERENCE TO RELATED APPLICATIONS

This application is a National Phase of International Application No. PCT/KR2023/012615 which claims priority to Korean Patent Application No. 10-2022-0128327, filed on Oct. 7, 2022, the disclosures of each of which are incorporated herein by reference.

TECHNICAL FIELD

The present invention relates to a touch panel for detecting capacitive touch input from a human finger or a touch input tool having similar conductive characteristics thereto, and more particularly, to a touch panel having a sensing electrode with improved visibility.

BACKGROUND ART

Generally, a touch panel is attached to a display apparatus, such as a liquid crystal display (LCD), a plasma display panel (PDP), an organic light emitting diode (OLED) display, and an active-matrix organic light emitting diode (AMOLED) displays, and serves as an input device that generates a signal corresponding to a touched location upon touch by an object, such as a finger or a stylus. Touch panels are used in a wide range of fields, including small mobile terminals, industrial terminals, and digital information devices (DIDs), and the scope of their application is expanding.

FIGS. 1A, 1B and 1C are a view illustrating examples of a sensing electrode pattern of a typical capacitive touch panel.

A capacitive touch panel refers to a device that generates a predetermined capacitance between a touch pattern thereof and a human finger or a touch input tool having similar conductive characteristics thereto to determine the presence of a touch based on a change in voltage across the generated capacitance.

In response to increasing resolution requirements for sensing electrodes in devices such as smartphones, sensing electrodes constituting touch panels are becoming more sophisticated and diversified for accurate and rapid determination of touch locations.

The sensing electrode patterns shown in FIGS. 1A, 1B, and 1C illustrate typical capacitive touch patterns, wherein a unit pattern 100 is formed by abutment of two pieces 110*a*, 110*b* (see FIG. 1A), or a unit pattern is formed with an integral geometric shape (120 or 140) (see FIG. 1B and FIG. 1C).

Typical touch panels, such as those illustrated in FIGS. 1A, 1B, and 1C, are capable of achieving higher resolution by reducing the size of the unit patterns 100, 120, 140 themselves as needed.

Figure 2:
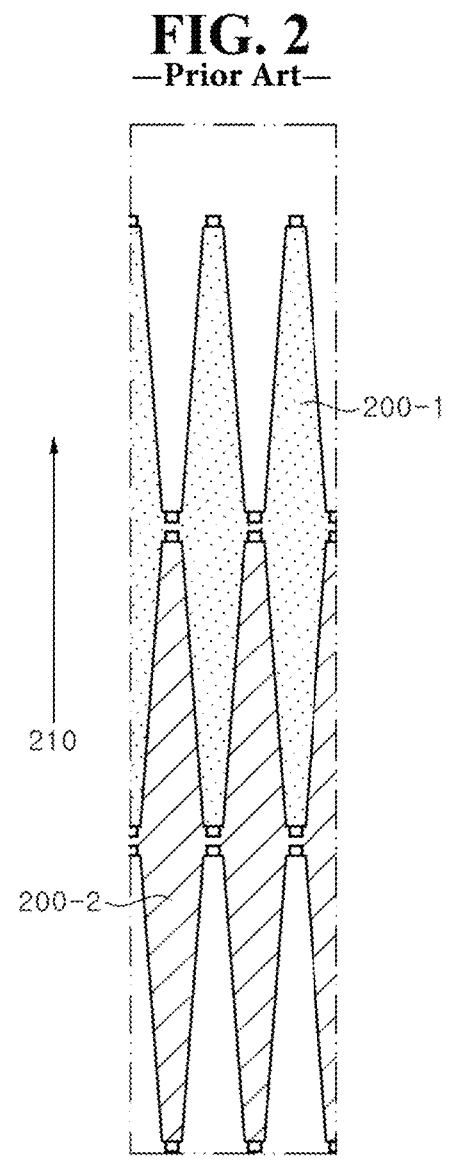

FIG. 2 is a view illustrating another example of a sensing electrode pattern of a typical capacitive touch panel.

Referring to FIG. 2, each column of the touch panel is formed by repeatedly arranging a shape in which a sensing electrode of a first pattern (200-1) and a sensing electrode of a second pattern (200-2) are vertically interlocked to each other, with phases thereof offset by 180 degrees with respect to each other.

As shown in FIG. 2, a column is formed by interlocking a first pattern and a second pattern of similar shapes with phases thereof horizontally reversed with respect to each other, followed by repeatedly arranging the interlocked pattern in a direction indicated by the arrow (210), that is, in a longitudinal direction. Subsequently, a sensing electrode of the touch panel is formed by repeatedly arranging a plurality of columns formed in the same manner as above.

However, the sensing electrode pattern as shown in FIG. 2 can cause reduced visibility of the touch panel.

DISCLOSURE

Technical Problem

It is an aspect of the present invention to provide a touch panel having sensing electrodes with improved visibility.

Technical Solution

In accordance with one aspect of the present invention, a touch panel having a sensing electrode with improved visibility includes:

a plurality of sensing electrodes formed of a transparent conductive material to generate a touch capacitance (Ct) upon approach or touch by a touch means; and a plurality of sensor signal lines transmitting a touch signal generated by the sensing electrodes to a touch IC, wherein both the sensing electrodes and the sensor signal lines are formed in a repeated zigzag shape.

Preferably, each of the sensing electrodes includes:

a first sub-pattern and a third sub-pattern each formed by connecting two '>'-shaped patterns in a longitudinal direction;

a second sub-pattern and a fourth sub-pattern formed by horizontally flipping the first sub-pattern and the third sub-pattern 180 degrees, respectively;

a first combination pattern in which the first sub-pattern and the second sub-pattern are connected at two points; and a second combination pattern in which the third sub-pattern and the fourth sub-pattern are connected at two points, wherein the first combination pattern and the second combination pattern are connected at one point.

Preferably, each of the sensing electrodes includes four sub-patterns connected in a transverse direction and each formed by connecting two '>'-shaped patterns in a longitudinal direction, and each of the four sub-patterns is connected to another sub-pattern adjacent thereto through one connection point.

Preferably, each of the sensor signal lines is formed by repetition of a '>'-shaped pattern in the longitudinal direction.

Preferably, the transparent conductive material includes one of indium tin oxide (ITO), carbon nanotubes (CNTs), antimony tin oxide (ATO), and indium zinc oxide (IZO).

Preferably, the touch capacitance is in the range of several femtofarads (fF) to tens of micro farads.

Advantageous Effects

Embodiments of the present invention provide a touch panel having a sensing electrode with improved visibility, in which both a sensing electrode and a sensor signal line are formed in a uniform zigzag pattern, thereby effectively improving visibility of the touch panel.

Embodiments of the present invention provide a touch panel having a sensing electrode with improved visibility, which ensures a reduced pattern area, thereby reducing influence of noise.

DESCRIPTION OF DRAWINGS

FIG. 2 is a view illustrating another example of a sensing electrode pattern of a typical capacitive touch panel.

BEST MODE

Figure 1A:
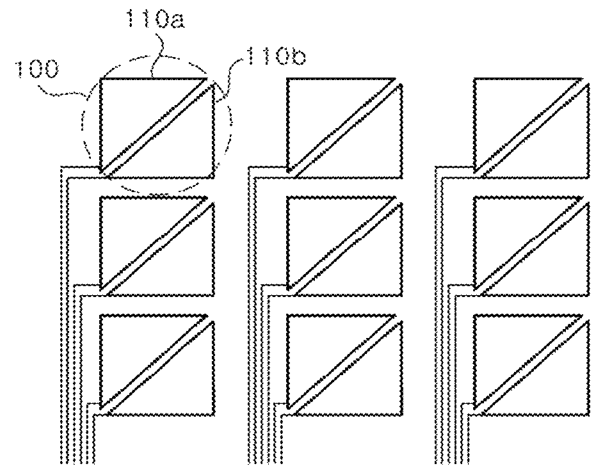
FIGS. 1A, 1B and 1C are a view illustrating examples of a sensing electrode pattern of a typical capacitive touch panel.
Figure 1B:
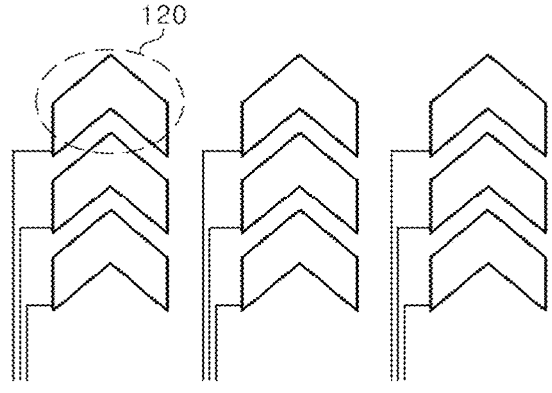
Figure 1C:
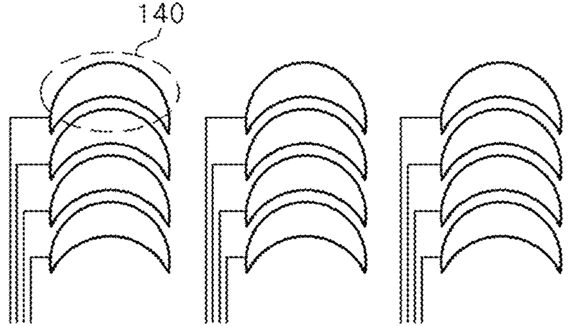

For full understanding of the present invention, operational advantages thereof, and the purposes accomplished by practice thereof, reference is made to the accompanying drawings, which illustrate preferred embodiments of the invention, and to the description thereof.

Hereinafter, the present invention will be described in detail with reference to preferred embodiments of the present invention illustrated in the accompanying drawings. It should be noted that like elements will be denoted by like reference numerals throughout the specification and the accompanying drawings.

Hereinafter, preferred embodiments of the present invention will be described in detail with reference to the accompanying drawings.

Herein, “touch panel” refers to a capacitive touch panel, which is a device that generates a predetermined capacitance between a touch pattern thereof and a human finger or a touch input tool having similar conductive characteristics thereto to detect the presence of a touch based on a change in voltage across the generated capacitance.

Herein, “visibility” refers to the degree to which sensing electrodes and sensor signal lines formed on a display are directly visible to a user’s naked eye.

Herein, “improving visibility” means making the sensing electrodes and the sensor signal lines less visible to a user’s naked eye.

In addition, “improving visibility” means reducing image distortion (moiré) caused by interference of light emitted from a display screen by sensing electrodes and sensor signal lines formed on a display.

Figure 3:
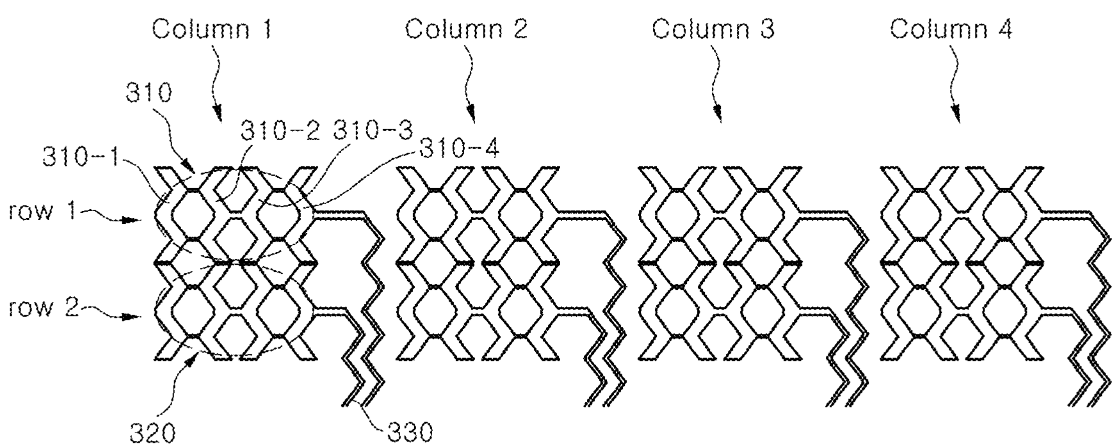
FIG. 3 is a plan view of a touch panel having sensing electrodes with improved visibility according to one embodiment of the present invention.

FIG. 3 is a plan view of a touch panel having a sensing electrode with improved visibility according to one embodiment of the present invention.

The touch panel having a sensing electrode with improved visibility according to the present invention includes a plurality of sensing electrodes 310 and a plurality of sensor signal lines 330.

The sensing electrodes and the sensor signal lines are formed of a transparent conductive material.

The transparent conductive material may include, for example, indium tin oxide (ITO), carbon nanotubes (CNTs), antimony tin oxide (ATO), or indium zinc oxide (IZO).

The sensing electrodes of the touch panel are arranged in a matrix of multiple columns and multiple rows.

The touch panel includes a plurality of sensing electrodes 310, 320 (in column 1, column 2, . . . ) arranged in a matrix. The sensing electrodes are formed of a transparent conductive material so as to generate a touch capacitance Ct upon approach or touch by a touch means.

The touch panel according to the present invention includes a plurality of sensor signal lines 330.

The sensor signal line transmits a touch signal generated by the sensing electrode to a touch IC (not shown) to determine the presence of a touch and to extract touch coordinates.

Here, the touch signal is a voltage signal across the touch capacitance Ct.

A touch pattern of the sensing electrode formed of a conductive material can generate a touch capacitance Ct upon approach or touch by a touch means. The touch capacitance generated upon approach or touch by the touch means is in the range of several femto-farads (fF) to tens of micro farads (μF).

Both the sensing electrode and the sensor signal line according to the present invention are formed in a repeated zigzag shape. The zigzag shapes forming the sensing electrode and the sensor signal line have a small pattern area, thereby improving visibility of the touch panel while significantly reducing influence of noise.

Referring to FIG. 3, each of the sensing electrodes includes several sub-patterns and a combination pattern in which sub-patterns are connected to each other.

A first sub-pattern 301-1 of the sensing electrode 310 according to the present invention is formed by connecting two ‘>’-shaped patterns in a longitudinal direction. A third sub-pattern 310-3 of the sensing electrode 310 is formed in the same manner as the first sub-pattern 301-1.

A second sub-pattern 301-2 of the sensing electrode 310 is formed by horizontally flipping the first sub-pattern 301-1 180 degrees.

A fourth sub-pattern 301-4 of the sensing electrode 310 is formed by horizontally flipping the third sub-pattern 301-3 180 degrees.

The first sub-pattern 301-1 and the second sub-pattern 301-2 are connected at two points to form a first combination pattern.

The third sub-pattern 301-3 and the fourth sub-pattern 301-4 are connected at two points to form a second combination pattern. The first combination pattern and the second combination pattern are connected at one point.

As shown in FIG. 3, each of the sensing electrodes includes four sub-patterns, wherein the sub-patterns are connected in pairs to form two combination patterns.

Each of the sensor signal lines is formed by repetition of a ‘>’-shaped pattern in the longitudinal direction.

Figure 4:
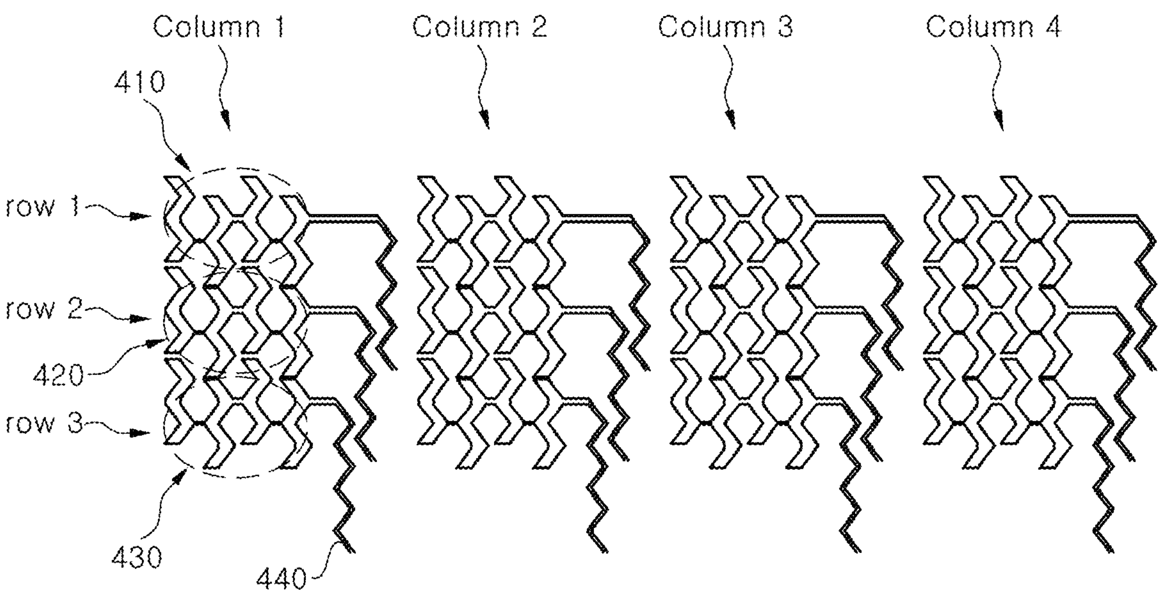
FIG. 4 is a plan view of a touch panel having sensing electrodes with improved visibility according to another embodiment of the present invention.

FIG. 4 is a plan view of a touch panel having a sensing electrode with improved visibility according to another embodiment of the present invention.

Referring to FIG. 4, a sensing electrode 410 is formed by connecting four sub-patterns in a transverse direction, wherein each of the sub-patterns is formed by connecting two ‘>’-shaped patterns in the longitudinal direction.

Each of the four sub-patterns is connected to another sub-pattern adjacent thereto through one connection point.

A sensor signal wire 440 is formed by repetition of a ‘>’-shaped pattern in the longitudinal direction.

Although some embodiments have been described herein, it should be understood by a person having ordinary knowledge in the art that the present invention is not limited to the above embodiments and the accompanying drawings and that various modifications, variations, and alterations can be made without departing from the spirit and scope of the invention.

The invention claimed is:

1. A touch panel having a sensing electrode with improved visibility, comprising:

a plurality of sensing electrodes formed of a transparent conductive material to generate a touch capacitance (Ct) upon approach or touch by a touch means; and a plurality of sensor signal lines transmitting a touch signal generated by the sensing electrodes to a touch IC, wherein both the sensing electrodes and the sensor signal lines are formed in a repeated zigzag shape, wherein each of the sensing electrodes comprises:

a first sub-pattern and a third sub-pattern each formed by connecting two '>'-shaped patterns in a longitudinal direction;

a second sub-pattern and a fourth sub-pattern formed by horizontally flipping the first sub-pattern and the third sub-pattern 180 degrees, respectively;

a first combination pattern in which the first sub-pattern and the second sub-pattern are connected at two points; and a second combination pattern in which the third sub-pattern and the fourth sub-pattern are connected at two points, wherein the first combination pattern and the second combination pattern are connected at one point.

2. The touch panel according to claim 1, wherein each of the sensing electrodes comprises four sub-patterns connected in a transverse direction and each of the four sub-patterns formed by connecting two '>'-shaped patterns in a longitudinal direction, and each of the four sub-patterns is connected to another sub-pattern adjacent thereto through at least one connection point.

3. The touch panel according to claim 2, wherein each of the sensor signal lines is formed by repetition of a '>'-shaped pattern in the longitudinal direction.

4. The touch panel according to claim 1, wherein the transparent conductive material comprises one of indium tin oxide (ITO), carbon nanotubes (CNTs), antimony tin oxide (ATO), and indium zinc oxide (IZO).

5. The touch panel according to claim 1, wherein the touch capacitance is in the range of several femto-farads (fF) to tens of micro farads (μF).

* * * * *